United States Patent
Krumme et al.

[11] Patent Number: 6,116,733
[45] Date of Patent: Sep. 12, 2000

[54] HINGE CONNECTION FOR A TEMPLE PIECE OF AN EYEGLASS FRAME

[75] Inventors: John F. Krumme, Tahoe City; Thomas W. Duerig, Fremont, both of Calif.

[73] Assignee: The Beta Group, Menlo Park, Calif.

[21] Appl. No.: 08/869,709

[22] Filed: Jun. 5, 1997

[51] Int. Cl.[7] .................................................... G02C 5/14
[52] U.S. Cl. ........................... 351/114; 351/111; 351/153
[58] Field of Search ..................... 351/153, 140, 351/113, 111, 116, 41; 16/228

[56] References Cited

U.S. PATENT DOCUMENTS

| | | |
|---|---|---|
| 1,445,249 | 2/1923 | Vienot . |
| 2,745,314 | 5/1956 | Rabb . |
| 3,052,159 | 9/1962 | Gross et al. . |
| 3,762,804 | 10/1973 | Livas . |
| 4,131,340 | 12/1978 | Preston . |
| 5,418,581 | 5/1995 | Conway ................................. 351/153 |

FOREIGN PATENT DOCUMENTS

| | | |
|---|---|---|
| 2 468 927 | 5/1981 | France . |
| 94/28454 | 12/1994 | WIPO . |
| 96/27744 | 9/1996 | WIPO . |
| 97/21135 | 6/1997 | WIPO . |

*Primary Examiner*—Hung Xuan Dang
*Attorney, Agent, or Firm*—Burns, Doane, Swecker & Mathis, L.L.P.

[57] ABSTRACT

A hinge connection for a temple piece of an eyeglass frame having a hinge pin extending from a portion thereof. The temple piece includes a resilient portion biased against the hinge pin so as to attach the temple piece to the eyeglass frame. The temple piece is rotatable about the hinge pin and the resilient portion provides a tight hinge connection with the hinge pin and compensates for wear between the hinge pin and temple piece over extended use of the eyeglass frame.

20 Claims, 6 Drawing Sheets

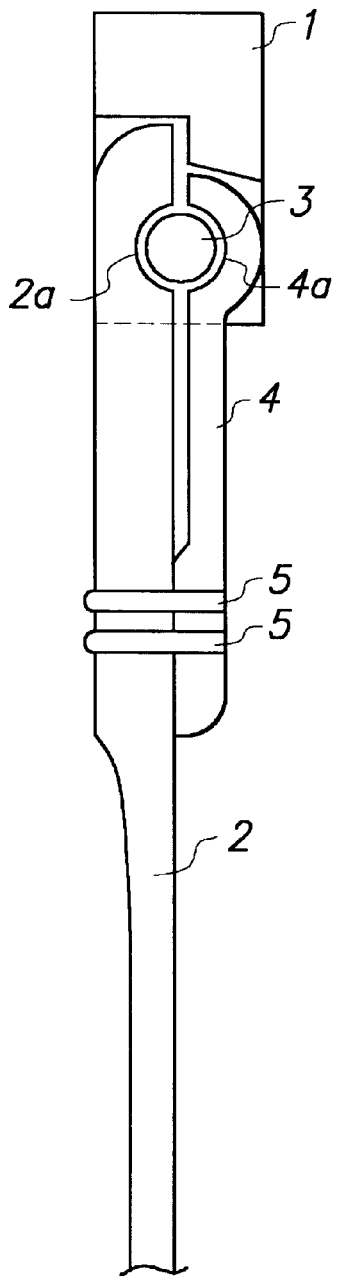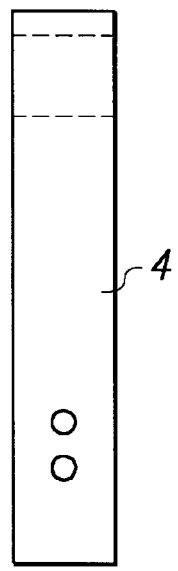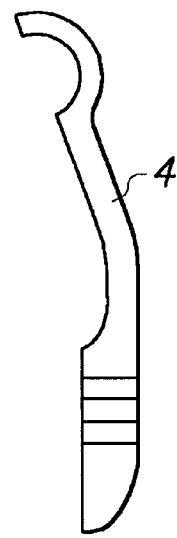
FIG. 1a
FIG. 1b
FIG. 1c

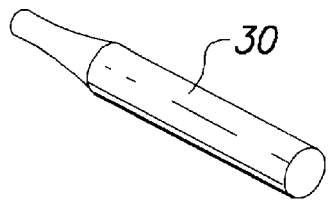
FIG. 5A
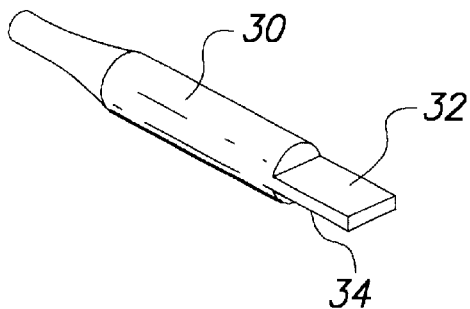
FIG. 5B
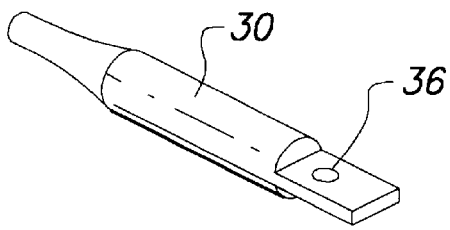
FIG. 5C
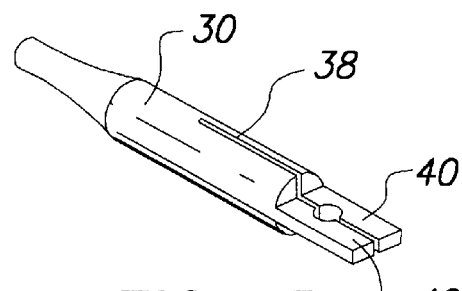
FIG. 5D
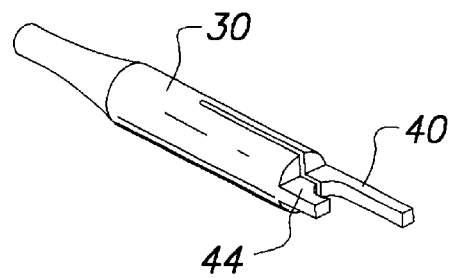
EIG. 5E
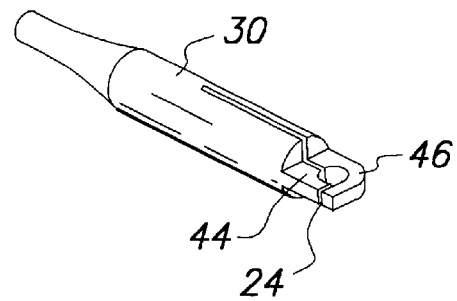
FIF. 5F

HINGE CONNECTION FOR A TEMPLE PIECE OF AN EYEGLASS FRAME

FIELD OF THE INVENTION

The invention relates to a hinge connection for an eyeglass frame.

BACKGROUND OF THE INVENTION

It has been conventional to utilize small screws for attaching various eyeglass frame components together to form a completed frame. Screws have been used to attach temple pieces at the hinge to lens frames. They are also used to tension and anchor or lock lenses into lens frames allowing assembly and disassembly for replacement of lenses or damaged components or initial shipping of frames with demonstration lenses in place.

In normal use, eyeglass frames are subjected to stresses and strains in a cyclical manner that tend to loosen screws and wear the threads with which the screws are mated resulting in temple pieces becoming loose or detached and lenses falling out of their frames.

Various methods to minimize this problem have been tried with limited success. Examples are polymeric compounds often referred to as "locktite" intended to at least slow down the loosening process. This method requires individual coating of the screws which is expensive and provides only limited improvement over uncoated screws eventually succumbing to the same process of loosening. Another example of a method intended to "lock" the screws in place is the use of distorted threads on the screw to create a mechanical jamming action with the mating threads. This method offers only limited improvement and eventually will succumb to the loosening process as well. Both methods make any replacement or disassembly and reassembly process difficult or impossible and do not accommodate wear of the mated components even if loosening or backing out of the screws does not occur.

SUMMARY OF THE INVENTION

The invention provides a hinge connection for a temple piece of an eyeglass frame. The eyeglass frame includes a hinge pin extending from a portion thereof and the temple piece includes a resilient portion biased against the hinge pin so as to attach the temple piece to the eyeglass frame. The temple piece is rotatable about the hinge pin and the resilient portion provides a tight hinge connection with the hinge pin which compensates for wear between the hinge pin and temple piece over extended use of the eyeglass frame.

According to one embodiment of the invention, the resilient portion includes a fixed end and a moveable free end, the free end being adapted to snap-fit over the hinge pin. The hinge pin can have any desirable cross-section. For instance, the hinge pin can have a cylindrical or non-cylindrical cross-section. The resilient portion can be of any suitable material such as stainless steel, β-Ti, Be-Cu or superelastic NiTi material. The temple piece and resilient portion include surfaces in contact with the hinge pin and the surfaces are configured to mate with corresponding surfaces on the hinge pin. As an example, the hinge pin can be cylindrical and the temple piece and resilient portion can include cylindrical surfaces in contact with the hinge pin. Alternatively, the hinge pin can have a square or hexagonal cross-section and the temple piece and resilient portion can each include surfaces configured to mate with the corresponding surfaces on the hinge pin.

According to another embodiment of the invention, the resilient portion can comprise an elastically deformable element surrounding the temple piece. The temple piece can be split so as to include first and second arms with the hinge pin therebetween. The element can be arranged to surround the arms so as to press the arms against the hinge pin. The arms can include deflectable free ends adapted to snap-fit over the hinge pin. The element can be slidable along the arms from a first position at which the arms can be spread apart and fitted over the hinge pin to a second position at which the element resiliently biases the arms against the hinge pin. As in the first embodiment, the arms can include surfaces in contact with the hinge pin and the surfaces can be configured to mate with corresponding surfaces on the hinge pin. For instance, the hinge pin can have a cylindrical or non-cylindrical cross-section and the arms can include surfaces which mate with the corresponding surfaces on the hinge pin.

BRIEF DESCRIPTION OF THE DRAWINGS

FIGS. 1a–1c show a first embodiment of the hinge connection according to the invention wherein FIG. 1a shows the complete assembly, FIG. 1b shows a top view of the resilient portion of the temple piece and FIG. 1c shows a side view of the resilient portion prior to being assembled on the temple piece;

FIGS. 5a–5f show details of processing temple pieces in accordance with the third embodiment;

DETAILED DESCRIPTION OF THE INVENTION

A primary objective of the invention is to overcome the tendency of existing eyeglass frame temple hinges to become sloppy and loose over time and to eliminate the loss of screws commonly associated with this loosening and sloppy hinge phenomenon.

A basic concept of the invention is to provide a spring biased member or members as part of a temple piece that grip a hinge pin so that as wear occurs the spring bias compensates and continues to provide an essentially constant force on the hinge pin. The hinge will therefore provide a uniform feel to the user over time and use without loosening or tightening. The hinge pin replaces the screw used in existing eyeglass frame hinges and will not loosen or fall out over extended use of the eyeglass frame.

The hinge connection of the invention can be designed to allow the temple piece to snap-on a hinge pin of an eyeglass frame. The hinge assembly thus eliminates the use of screws and avoids the loosening or loss of screws and spontaneous disassembly of eyeglass frames. The hinge connection can include positional biased stops to hold the temple pieces in open or closed positions. For instance, such positional biased stops can be provided by the use of lobed hinge pins and mating spring bias elements. The hinge connection provides a simple arrangement for assembling or disassembling temple pieces to the eyeglass frame thus allowing the optician to easily replace temple pieces for purposes of replacing damaged temple pieces or for functional or aesthetic reasons. The hinge connection can incorporate one or more parts of suitable materials including β-titanium, BeCu, stainless steel, superelastic NiTi or plastic materials having suitable polymer properties.

Figure 2A:
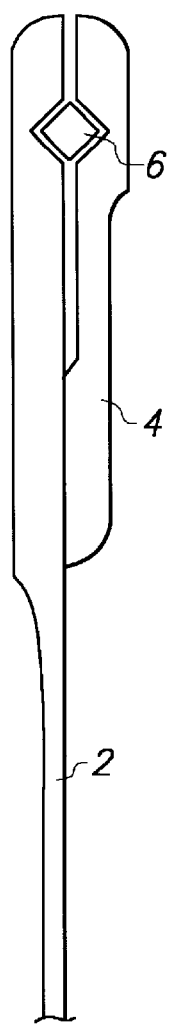
FIGS. 2a–2b show alternative constructions of the hinge pin and mating surfaces of the temple piece and resilient portion.
Figure 2B:
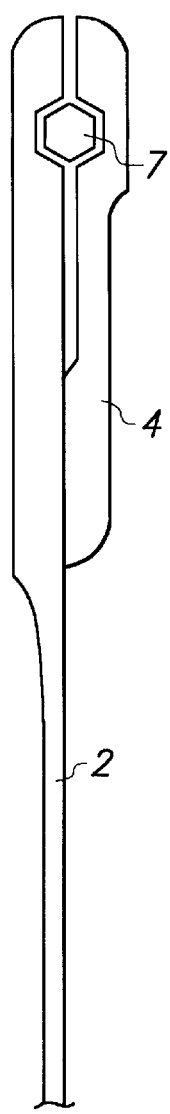
Figure 3A:
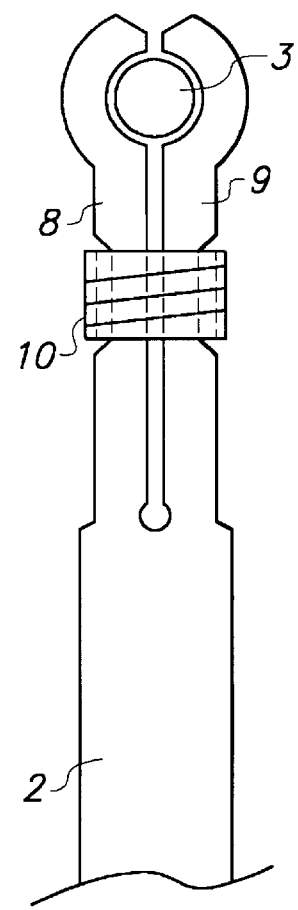
FIGS. 3a–3b show a second embodiment of the hinge connection according to the invention wherein the temple piece includes a pair of arms surrounding the hinge pin and an elastically deformable element surrounding the arms, FIG. 3a showing the completed assembly and FIG. 3b showing the elastically deformable element in a non-deformed condition and in an elastically deformed condition.
Figure 3B:
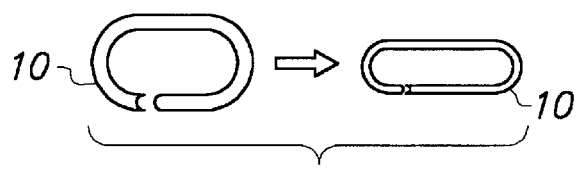

FIGS. 1–3 show various embodiments of the invention. FIGS. 1a–c show an embodiment wherein the hinge pin has a cylindrical cross-section whereas as FIGS. 2a–b show hinge pins having square and hexagonal cross-sections. FIGS. 3a–b show another embodiment of the invention wherein the temple piece includes a pair of arms surrounding the hinge pin and a slidable resilient element holding the arms in contact with the hinge pin.

FIG. 1a shows a temple hinge connection for an eyeglass frame 1 wherein a temple piece 2 is rotatable about a hinge pin 3 on the eyeglass frame. The temple piece 2 includes a resilient portion 4 biased against the hinge pin so as to attach the temple piece to the eyeglass frame. The resilient portion 4 includes a fixed end attached to the temple piece 2 by suitable means such as rivets 5. The resilient portion 4 also includes a movable free end which is adapted to snap-fit over the hinge pin. FIG. 1b shows a top view of the resilient portion 4 and FIG. 1c shows a side view of the resilient portion 4 prior to being attached to the temple piece. Thus, when the resilient portion 4 is attached to the temple piece, the free end of the resilient portion 4 is elastically deformed away from the temple piece 2 so as to provide a tight hinge connection with the hinge pin and compensate for wear between the hinge pin and the temple piece over extended use of the eyeglass frame.

In the embodiment shown in FIGS. 1a–c, the hinge pin can have a diameter such as 0.10 inch or 0.053 inch and the width of the resilient portion 4 shown in FIG. 1b can be 0.20 inch. In the pre-assembled condition, the resilient portion 4 can include a free end which is elastically bent 20° when the resilient portion is attached to the temple piece. The length of the resilient portion 4 can range from 1.0 to 1.5 inch.

FIGS. 2a–b show alternative designs for the hinge pin. In FIG. 2a, the hinge pin 6 has a square cross-section whereas the hinge pin 7 in FIG. 2b has a hexagonal cross-section. The temple piece and resilient portion include mating surfaces which press against corresponding surfaces of the hinge pin 6 in FIG. 2a and against the hinge pin 7 in FIG. 2b. Thus, the hinge pin can have a cylindrical or non-cylindrical geometry. The noncylindrical pin geometry provides specific positional "stops" for the temple/hinge combination. It should be understood, however, that the non-cylindrical hinge pin geometry can have a wide range of shapes such as rounded multi-lobed pin geometry in addition to the specific shapes shown in FIGS. 2a–b.

FIGS. 3a–b show a second embodiment of the hinge connection according to the invention. In this embodiment, the temple piece 2 is longitudinally split so as to include a pair of arms 8,9 which surround the hinge pin 3. Although a cylindrical hinge pin 3 is shown in FIG. 3a, the hinge pin can have any suitable geometry such as those shown in FIGS. 2a–b. As shown in FIG. 3a, the resilient portion comprises an elastically deformable element 10 surrounding the arms of the temple piece. The element 10 can be slidably arranged on the temple piece 2 such that the element 10 can be moved away from the hinge pin 3 to allow the arms 8,9 to snap-fit over the hinge pin 3. The element can then be slid towards the hinge pin 3 to provide the desired biasing force between the arms 8,9 and the hinge pin 3. The element 10 can comprise a sleeve or band made from helically wrapped ribbon or wire of material such as stainless steel, BeCu, β-titanium or other suitable material exhibiting reasonable springiness. As shown in FIG. 3b, the element 10 can have the shape shown to the left of FIG. 3b in the non-assembled condition and have the shape shown to the right of FIG. 3b when elastically expanded and mounted over the arms 8,9. The temple piece 2 can be of any suitable material such as stainless steel, BeCu, or any other variety of standard metal eyeglass frame materials.

In order to assemble or disassemble the hinge connection according to the invention, the resilient portion 4 can be pried open with a suitable hand tool and positioned over the hinge pin after which the tool is removed to release the resilient portion. In the embodiment shown in FIGS. 3a–b, the resilient portion 10 is slid to a position away from the hinge pin 3 to allow the arms to be spread apart and slipped over the hinge pin. The element 10 is then slid forward to clamp the arms around the hinge pin.

Figure 4:
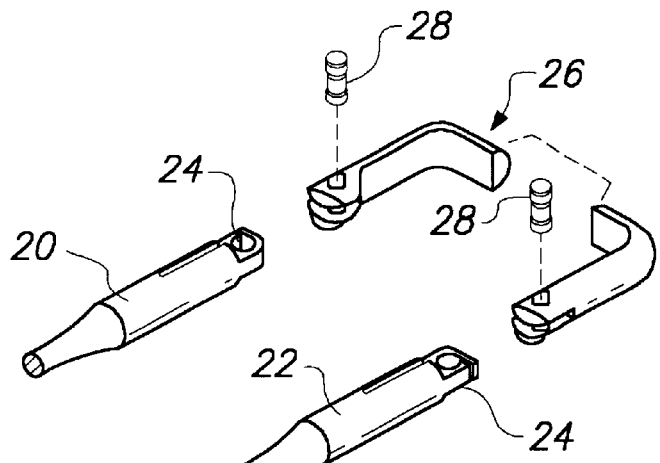
FIG. 4 shows a third embodiment of a hinge connection according to the invention.

FIG. 4 shows a third embodiment of the hinge connection according to the invention wherein temple pieces 20,22 include a slotted hinge pin opening 24 for connecting the temple pieces to an eyeglass frame 26 via hinge pins 28. The temple pieces can be of any suitable material such as plastic, metal or combination thereof (e.g., stainless steel, titanium or titanium alloy, shape memory material, etc.). FIGS. 5a–f show various steps for making a temple piece 20,22 having the slotted hinge pin opening. FIG. 5a illustrates a swaged blank 30 which is processed by machining or otherwise to provide two flats 32,34 as shown in FIG. 5b. In the next step, a circular hole 36 is drilled or otherwise provided in the flats as shown in FIG. 5c. Next, a slot 38 is cut axially along a portion of the length of the temple piece beyond the flats as shown in FIG. 5d to form a pair of extensions 40,42. As shown in FIG. 5e, a portion of one of the extensions is removed to create an offset formed by the remaining stub 44. The other extension 40 is then plastically deformed towards the stub 44 to form a bent extension 46 and thus create the slotted hinge pin opening 24 shown in FIG. 5f. In the case where the temple piece is of a heat treatable material, the thus formed temple piece can then be heat treated to achieve a desired spring temper.

Figure 6A:
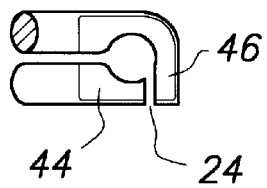
FIGS. 6a–6c show details of a slotted hinge pin connection in accordance with the third embodiment of the invention.
Figure 6B:
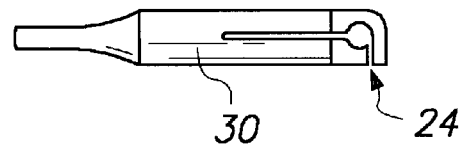
Figure 6C:
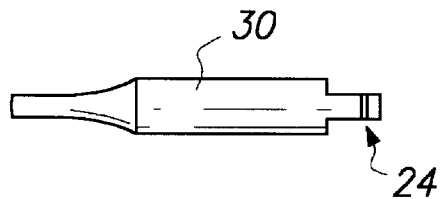
Figure 7A:
FIGS. 7a–7b show details of a hinge pin in accordance with the third embodiment of the invention.
Figure 7B:

FIG. 6a shows an enlarged view of the slotted opening 24 in the temple piece. The diameter of the hole is sized to provide a spring force acting on the hinge pin 28. FIG. 6b shows a top view of the temple piece 30 and FIG. 6c shows a side view of the temple piece 30. The hinge pin 28 can have the dumbbell shape shown in FIG. 7a wherein the ends have a diameter larger than a portion therebetween, the smaller diameter portion having a diameter about equal to or slightly larger than the diameter of the hinge pin hole 36. FIG. 7b shows an end view of the hinge pin 28.

Figure 8:
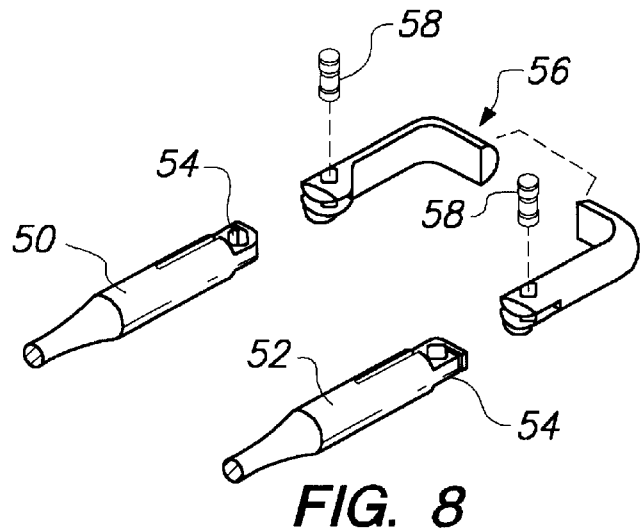
FIG. 8 shows a fourth embodiment of a hinge connection according to the invention.
Figure 9A:
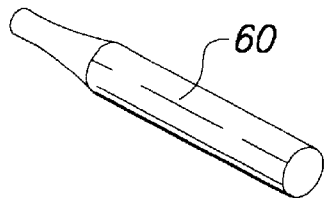
FIGS. 9a–9g show details of processing temple pieces in accordance with the fourth embodiment.
Figure 9E:
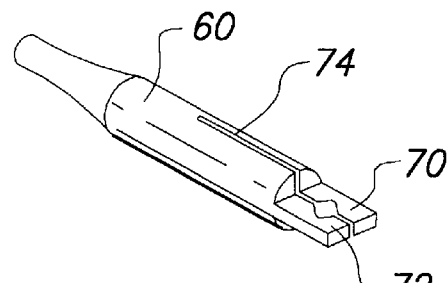
Figure 9B:
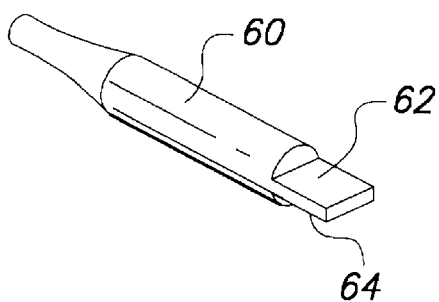
Figure 9F:
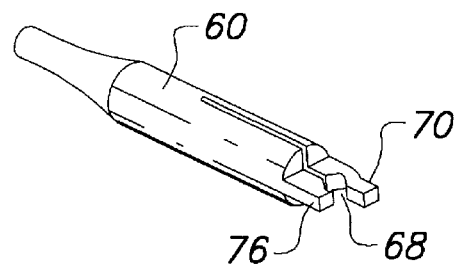
Figure 9C:
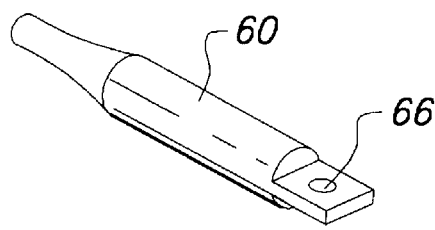
Figure 9G:
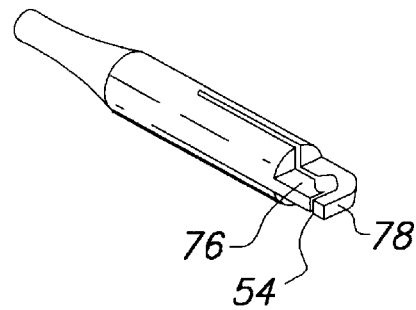
Figure 9D:
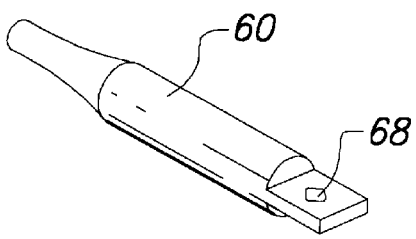

FIG. 8 shows a fourth embodiment of the hinge connection according to the invention. In this embodiment, temple pieces 50,52 include a slotted non-circular hinge pin opening 54 for connecting the temple pieces to an eyeglass frame 56 via non-circular hinge pins 58. FIGS. 9a–g show various steps for making a temple piece having the slotted hinge pin opening. FIG. 9a illustrates a swaged blank 60 which is processed by machining or otherwise to provide two flats as shown in FIG. 9b. In the next step, a circular hole 66 is drilled or otherwise provided in the flats as shown in FIG. 9c after which the hole is machined via broaching or otherwise to form a non-circular hole 68 (e.g., a square hole) as shown in FIG. 9d. Next, a slot 74 is cut axially along the length of the temple piece 60 as shown in FIG. 9e to form two extensions 70,72. As shown in FIG. 9f, a portion of one of the extensions is cut off to create an offset or stub 76 which begins adjacent the hole 68. The remaining extension 70 is then plastically deformed towards the offset to form a bent extension 78 and thus create the slotted hinge pin hole 54 shown in FIG. 9g. The formed temple piece can then be heat treated to achieve a desired spring temper.

Figure 10A:
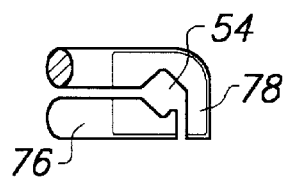
FIGS. 10a–10c show details of a slotted hinge pin connection in accordance with the fourth embodiment of the invention.
Figure 10B:
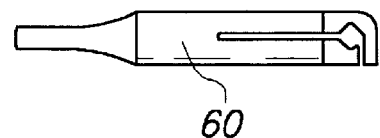
Figure 10C:
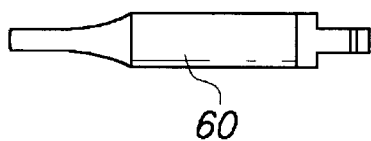
Figure 11A:
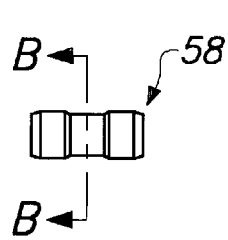
FIGS. 11a–11b show details of a hinge pin in accordance with the fourth embodiment of the invention.
Figure 11B:
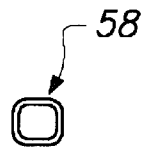

FIG. 10a shows an enlarged view of the slotted hole 54 in the temple piece 60. FIG. 10b shows a top view of the temple piece 60 and FIG. 10c shows a side view thereof. The diameter of the hole 54 is sized to provide a spring force acting on the hinge pin 58. The hinge pin 58 can have the dumbbell shape shown in FIG. 11a wherein the ends have a cross section larger than a portion therebetween, the smaller portion having cross section about equal to or slightly larger than the cross section of the hinge pin hole. As shown in FIG. 11b, the hinge pin 58 is generally square in cross section with rounded edges.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A hinge connection for a temple piece of an eyeglass frame, comprising:

an eyeglass frame having a hinge pin extending from a portion thereof; and a temple piece having a resilient portion thereof biased against the hinge pin so as to attach the temple piece to the eyeglass frame, the temple piece being rotatable about the hinge pin and the resilient portion providing a tight hinge connection with the hinge pin and compensating for wear between the hinge pin and temple piece over extended use of the eyeglass frame, the temple piece including a double slotted opening receiving the hinge pin, the double slotted opening being defined by opposed surfaces of an arm of the temple piece and the resilient portion, the double slotted opening including a first slot extending from a first portion of the double slotted opening and a second slot extending from a second portion of the opening.

2. The hinge connection of claim 1, wherein the resilient portion includes a fixed end and a moveable free end, the free end being adapted to snap-fit over the hinge pin.

3. The hinge connection of claim 1, wherein the hinge pin is cylindrical, or non-cylindrical in cross-section.

4. The hinge connection of claim 1, wherein the resilient portion is of stainless steel, β-Ti, Be-Cu or superelastic NiTi material.

5. The hinge connection of claim 1, wherein the opposed surfaces are in contact with the hinge pin, the opposed surfaces being configured to mate with corresponding surfaces on the hinge pin.

6. The hinge connection of claim 1, wherein the resilient portion is biased against the hinge pin by an elastically deformable element surrounding the arm and the resilient portion.

7. The hinge connection of claim 6, wherein the arm and resilient portion include free ends adapted to snap-fit over the hinge pin.

8. The hinge connection of claim 6, wherein the elastically deformable element is slidable along the arm and the resilient portion from a first position at which the arm and the resilient portion can be spread apart and fitted over the hinge pin to a second position and which the elastically deformable element resiliently biases the arm and the resilient portion against the hinge pin.

9. The hinge connection of claim 6, wherein the opposed surfaces are configured to mate with corresponding surfaces on the hinge pin.

10. The hinge connection of claim 6, wherein the hinge pin is cylindrical or non-cylindrical in cross-section.

11. The hinge connection of claim 1, wherein the first and second slots are spaced about 180 degrees apart around the double slotted opening.

12. The hinge connection of claim 1, wherein the resilient portion comprises a plastically deformed portion of the temple piece.

13. The hinge connection of claim 1, wherein the hinge pin opening is circular.

14. The hinge connection of claim 1, wherein the hinge pin opening is non-circular.

15. The hinge connection of claim 1, wherein the temple piece has been heat treated to a desired spring temper.

16. The hinge connection of claim 1, wherein the hinge pin is dumbbell-shaped.

17. The hinge connection of claim 1, wherein the hinge pin is discrete from the temple piece.

18. The hinge connection of claim 1, wherein the first and second slots are spaced about 90 degrees apart around the double slotted opening.

19. The hinge connection of claim 1, wherein the temple piece includes a pair of flat surfaces, the hinge pin opening extending in a direction perpendicular to and passing through the flat surfaces.

20. The hinge connection of claim 19, wherein the frame includes a pair of opposed surfaces in contact with the flat surfaces.

* * * * *